May 8, 1951      F. J. PERILLO      2,552,211
PROJECTOR WITH ADJUSTABLE LENS AND
TRANSPARENCY CARRIER ASSEMBLY
Filed March 13, 1950      2 Sheets—Sheet 1
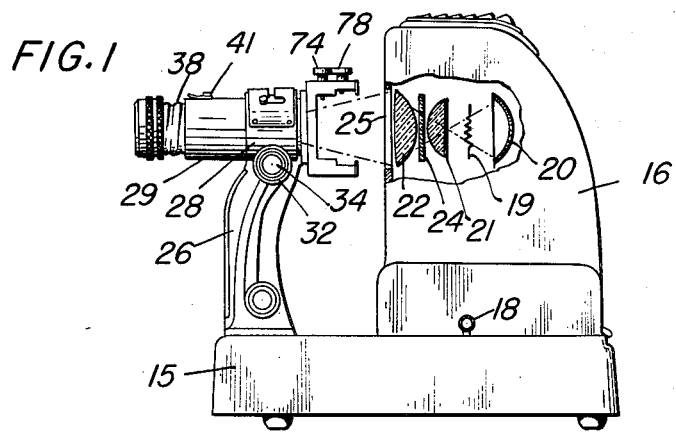
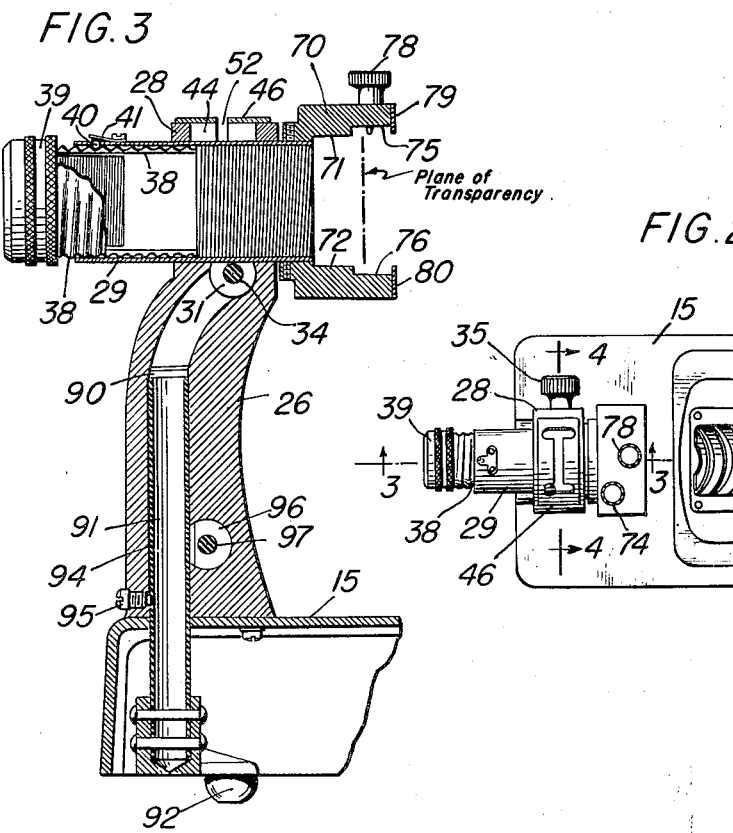
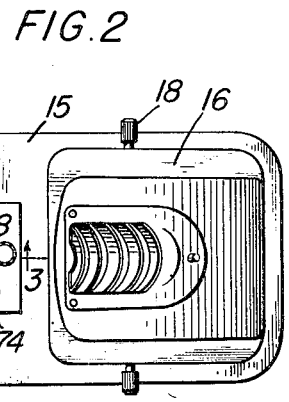
*INVENTOR.*
Florindo J. Perillo
BY
*Attorneys.*

May 8, 1951        F. J. PERILLO        2,552,211
PROJECTOR WITH ADJUSTABLE LENS AND
TRANSPARENCY CARRIER ASSEMBLY
Filed March 13, 1950        2 Sheets-Sheet 2
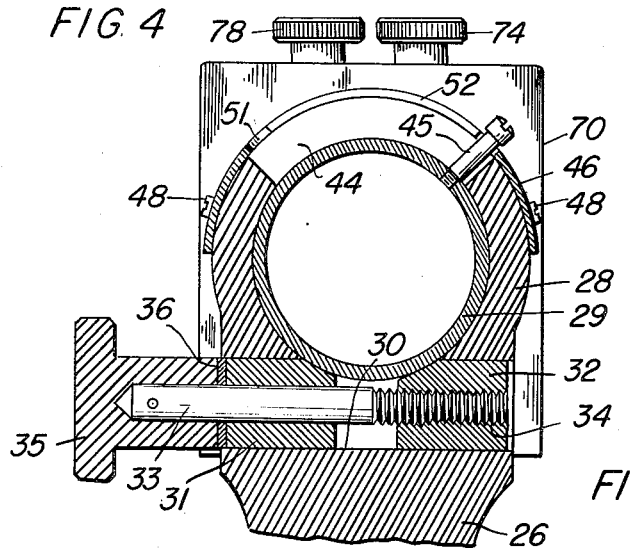
INVENTOR.
Florindo J. Perillo
BY
Williams, Rich & Morse
Attorneys.

Patented May 8, 1951

2,552,211

UNITED STATES PATENT OFFICE 2,552,211

PROJECTOR WITH ADJUSTABLE LENS AND TRANSPARENCY CARRIER ASSEMBLY

Florindo J. Perillo, Jackson Heights, N. Y., assignor to Viewlex, Inc., Queens County, N. Y., a corporation of New York Application March 13, 1950, Serial No. 149,371

6 Claims. (Cl. 88—28)

The present invention relates to projectors for transparencies and more particularly to projectors for use with filmstrips or slides on which the pictures, or other material to be projected, may be of different sizes and, with respect to filmstrips, arranged either longitudinally or crosswise of the strip.

A filmstrip, as the term is here used, is a strip of film, usually of the 35 mm. type, carrying positive photographic transparencies or prints adapted for the projection of enlarging "still," as distinguished from "moving" pictures. These pictures may be of different sizes and may be differently arranged on filmstrips. The two commonly used picture sizes are known as "single frame" and "double frame." The former has a picture area of about 18 x 24 mm. and the longer dimension of this picture extends crosswise of the filmstrip. The double frame size is 24 x 36 mm. and the longer dimension of the picture extends longitudinally of the filmstrip. Film slides are usually double frame size individually mounted. Any single filmstrip usually carries pictures of only one size but these may be arranged so that the pictures are viewed in their proper aspect when the filmstrip is either vertical or horizontal. It is often necessary or desirable to intermix pictures each of which can be projected right side up only by moving the film from vertical to horizontal, or vice versa, through a 90° angle, and there is a need for projection equipment in which this change of position can be made with speed and facility, with accurate stopping in either the vertical or horizontal position.

Efficient projectors are commonly equipped with illumination systems employing optical condensers which deliver a converging light beam. To make the most effective use of such lighting systems the smaller or single frame pictures should be positioned in the cone of light at a greater distance from the light source than the larger or double frame pictures so that the maximum amount of light falls on the picture area. The optimum position for a double frame picture would result in inefficient utilization of light if a single frame picture were projected from the same plane since a large amount of usable light would fall outside of the single frame picture area.

The general object of the invention is to provide an improved projector in which these desiderata are met by the provision of means by which the transparency, whether it be a slide or filmstrip, can be quickly and accurately positioned both with respect to its distance from the light source, according to the size of its picture area, and with respect to its horizontal or vertical position.

Other objects and advantages will in part appear and in part will be evident from the following description of the present preferred embodiments of the invention, taken with the drawings in which:

Fig. 1 is a side elevation of a projector with a wall of the lamp housing broken away to show the elements of an illumination system;

Fig. 2 is a plan view of the projector;

Fig. 3 is a central sectional elevation taken on the line 3—3 of Fig. 2;

Fig. 4 is an enlarged detailed sectional elevation taken on the line 4—4 of Fig. 2;

Fig. 5 is a plan of the film plane and position locating plate as shown in Figs. 1-4;

Fig. 6 is a similar view of a modified form of locating plate;

Fig. 7 is a similar view of a further modification of the locating plate;

Fig. 8 shows a film slide in projection position having a picture area of double frame size;

Fig. 9 is a section of filmstrip carrying pictures of double frame size in vertical and horizontal positions; and Fig. 10 is a section of filmstrip carrying pictures of single frame size in vertical and horizontal positions.

Referring to Figs. 1-4, the projector has a base 15, a light source housing 16 secured thereto by thumb screws 18 within which are the illumination system components comprising a lamp filament 19, reflector 20, condenser elements 21 and 22 and an infra-red filter 24. The light beam emerges through an opening 25 in the front of housing 16, the boundaries of the unobstructed cone of light being indicated by the converging broken lines extending forwardly from the condenser element 22.

Secured to the front end of base 15 is a fixed support or pedestal 26 having a generally cylindrical head 28 having a cylindrical passage provided (as hereinafter described) with parallel slots connected by a slot located at a right angle to the parallel slots in which opening is slidably and rotatably mounted a tube 29. At the junction of the support 26 and head 28 is a cylindrical cross-bore 30 which intersects tube 29 and in which slide the cylindrical, beveled wedge blocks 31 and 32. (See Fig. 4.) These blocks are preferably made of impregnated fiber, molded plastic or the like, block 31 being drilled to rotatably receive shaft 33 which has a threaded connection 34 with the block 32, the other end of shaft 33 being secured to a knob 35. A bearing washer 36 is interposed between the knob 35 and block 31. It will thus be seen that clockwise rotation of the knob 35 will act to draw the blocks 31 and 32 together, thus exerting a wedging action on tube 29 which locks it in the head 28.

In the forward end of tube 29 is an externally threaded lens tube 38 carrying a lens mount 39. Tube 29 is provided with an aperture through which extends a detent 40 pressed downwardly against lens tube 38 by a spring 41, the detent frictionally engaging the threaded surface of the lens tube, so that rotation of the latter moves the lens to effect focusing.

The upper portion of head 28 is provided with an opening as shown at 44 (Figs. 3 and 4) to provide a space for the free travel, through a 90° angle and forward and backward, of a stop pin 45 which is screwed into tube 29. Overlying the opening 44 is an arcuate locating plate 46, attached to the head by means of screws 48. This plate, shown in plan view in Fig. 5, is provided with an H-shaped slot having longitudinally extending side legs 50 and 51 and a cross leg 52. The upper edge of the plate as seen in Fig. 5 is toward the front of the projector. The said slot will be seen to have four terminal positions for the pin 45 which moves therein, these positions being marked with suitable indicia, as shown in the drawing.

Fig. 6 shows a modified form of the locating plate having the same four terminal positions, similarly marked, but the slots are differently arranged. The front slot 54 and the rear slot 55 extend transversely of the line of projection and they are interconnected intermediate their ends by the longitudinal slot 56.

Fig. 7 shows a further modification of the locating plate in which three transverse slots 58, 59 and 60 are interconnected by the longitudinal slots 61 and 62.

The function of the three locating plates just described will be explained hereinafter, after describing how the film slides or film strips are supported in the projector.

Referring to Fig. 3, there is secured to the rear end of tube 29 a rectangular housing 70 which is open at the back and sides, the upper and lower inner surfaces being stepped as shown. The space between the forward steps 71 and 72 is provided to receive a film strip carrier (not shown) which may be locked in place by the set-screw 74 (Figs. 1, 2 and 4) and which will support the film strip in the plane indicated by the broken line which is designated "Plane of transparency." This film strip carrier may be of any suitable type designed to support and transport lengths of film such as those shown in Figs. 9 and 10. When it is desired to project slides such as that shown in Fig. 8, the filmstrip carrier is removed and a slide carrier is inserted between the rear steps 75 and 76 between which it is held by the set-screw 78. To further assist in securing the slide carrier the upper and lower rear faces of the housing 70 are provided with guide plates 79 and 80. The slide carrier is so constructed that when the slide is in position for projection it is likewise in the plane indicated by the broken line in Fig. 3.

Fig. 8 shows a typical film slide in which the transparency 81, which is of double frame size, is carried by a mount 82 which is 2" square. Since each slide is capable of being individually positioned in the slide carrier the housing 70 and its associated parts may be left in the position shown in Figs. 1 and 3 so that the slide transport of the slide carrier will move horizontally. However, the picture being of double frame size the lens tube 29 will be moved rearwardly to bring the slide closer to the front condenser element 22. In this position pin 45 will occupy the terminal position of the slot shown in Fig. 5 indicated by the indicia reading "Double Frame" and "H." "H" indicates horizontal position.

In the case of a filmstrip, the filmstrip carrier when inserted between the steps 71 and 72 transports the film in a direction parallel to the faces of the steps and with the housing 70 in the position shown in Figs. 1 and 3 this would bring about transport of the filmstrip in a horizontal direction. Thus the position of the parts as described above would be suitable for the projection of a double frame picture the horizontal dimension of which extends longitudinally of the film, such as the picture 84 in Fig. 9. Should the filmstrip bear pictures such as 85 which would require the film to be positioned for transport in a vertical direction, the lens tube 29 and the housing 70 are rotated through 90° by moving the pin 45 through the slots 50, 52 and 51 to the position indicated by the indicia "Double Frame," "V," the latter indicating "vertical."

Where a film strip like that shown in Fig. 10 bearing pictures of single frame size is used in the projector, a picture such as 86, the horizontal dimension of which extends crosswise of the film, requires the positioning of the pin 45 in the terminal position of slot 51 marked "H." It will be noted that this moves the plane of the transparency forwardly in the cone of light as well as giving it the correct angular position with the result that there is a greater concentration of light per unit area on the transparency. This is highly advantageous because the enlargement of a single frame picture to the same size as a double frame picture without loss of brilliance requires a greater concentration of light on the transparency. When a picture such as 88 is encountered, the lens tube is rotated to place the pin 45 in the position in the slot 50 indicated by "V."

With the locating plate slots positioned as shown in Fig. 5 it is necessary to move the lens tube forwardly or rearwardly through half the length of the slots 50 or 51 when changing its angular position and to avoid this the plate may be slotted, if desired, as shown in Fig. 6 so that when showing either single frame or double frame pictures the tube may be simply rotated without any forward or rearward movement to accommodate either horizontal or vertical pictures.

The modified form of plate shown in Fig. 7 having three slots for the angular adjustment of the transparency in three different planes is useful where the projector is designed to accommodate pictures of three different sizes. It will be obvious that any number of such slots may be used and that the slots may be located in any desired positions to make the most effective use of the illumination.

By turning knob 35 the tube 29, carrying the lens and the transparency, may be quickly locked in any desired position or the frictional resistance to turning of the tube may be adjusted to any desired degree.

Referring to Fig. 3, the fixed support 26 contains a vertical cylindrical bore 90 in which is slidably mounted a tube 91 carrying the front legs 92. Tube 91 is slotted as shown at 94 and a screw 95 engages the walls of the slot to prevent turning of the tube. By extending tube 91 to lower legs 92 the angular position of base 15 can be adjusted. Tube 91 is locked in its adjusted position by means of wedge blocks 96 drawn together by a screw 97 and similar in construction and operation to the lock for the tube 29 as shown in Fig. 4. This adjustable leg construction is however, no part of the invention claimed herein.

Since obvious modifications may be made in the details in the embodiment of the invention as described above, it is not to be considered as limited to such details but is to be construed broadly within the purview of the claims.

What is claimed is:

1. A projector, for use with filmstrip transparencies carrying picture areas of different sizes and arranged at right angles to one another, comprising an illumination system emitting a converging cone of light, a fixed support having therein a cylindrical passage a wall of which is provided with parallel slots having ends spaced 90° from one another, said parallel slots being connected by a slot located at a right angle to the parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said passage axially and rotatably for 90° to terminal positions corresponding to the ends of said parallel slots comprising a pin carried by said tube and cooperating with said slots, whereby said picture areas may be axially and angularly positioned in said cone of light so as to illuminate and project said picture areas properly.

2. A projector, for use with filmstrip transparencies carrying picture areas of different sizes and arranged at right angles to one another, comprising an illumination system emitting a converging cone of light, a fixed support having therein a cylindrical passage a wall of which is provided with two parallel slots having ends spaced 90° from one another, said parallel slots being connected by a slot located at right angles to the parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said passage axially and rotatably for 90° to four terminal positions corresponding to the ends of said parallel slots comprising a pin carried by said tube and cooperating with said slots, whereby said picture areas may be axially and angularly positioned in said cone of light so as to illuminate and project said picture areas properly.

3. A projector, for use with filmstrip transparencies carrying picture areas of different sizes and arranged at right angles to one another, comprising a fixed support having therein a cylindrical passage a wall of which is provided with parallel slots located transversely to the axis of said passage with their respective ends spaced 90° apart, said parallel slots being connected by a slot located at right angles to said parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said passage axially and rotatably for 90° to terminal positions corresponding to the ends of said parallel slots comprising a pin carried by said tube and cooperating with said slots, whereby said picture areas may be axially and angularly positioned in said cone of light so as to illuminate and project said picture areas properly.

4. A projector for use with filmstrip transparencies carrying picture areas of different sizes and arranged at right angles to one another, comprising an illumination system emitting a converging cone of light, a fixed support having therein a cylindrical passage a wall of which is provided with two parallel slots located parallel to the axis of said passage and spaced 90° from one another, said parallel slots being connected by a slot located at right angles to said parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said passage axially and rotatably for 90° to four terminal positions corresponding to the ends of said parallel slots comprising a pin carried by said tube and cooperating with said slots, whereby said picture areas may be axially and angularly positioned in said cone of light so as to illuminate and project said picture areas properly.

5. A projector for use with filmstrip transparencies carrying areas of different sizes and arranged at right angles to one another comprising, an illumination system emitting a converging cone of light, a fixed support having therein a cylindrical passage a wall of which is provided with two parallel slots located transversely to the axis of said passage with their respective ends spaced 90° apart, said parallel slots being connected by a slot located at right angles to said parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said passage axially and rotatably 90° to four terminal positions corresponding to the ends of said parallel slots comprising a pin carried by said tube and cooperating with said slots, whereby said picture areas may be axially and angularly positioned in said cone of light so as to illuminate and project said picture areas properly.

6. A projector for use with filmstrip transparencies carrying picture areas of different sizes and arranged at right angles to one another, comprising an illumination system emitting a converging cone of light, a fixed support having therein a cylindrical passage a wall of which is provided with three parallel slots located transversely to the axis of said passage with their respective ends spaced 90° apart, said parallel slots being connected by a slot located at right angles to said parallel slots, a tube slidably and rotatably mounted in said passage for movement rotatably and longitudinally in said cone of light, a projection lens carried by the front end of said tube, means carried by the rear end of said tube for supporting a filmstrip, and means for limiting the movement of said tube in said support at six axial and right-angular terminal positions comprising a pin carried by said tube and cooperating with said slots, whereby said picture areas may be axially and angularly positioned in said cone of light so as to illuminate and project said picture areas properly.

FLORINDO J. PERILLO.

REFERENCES CITED

The following references are of record in the file of this patent:

UNITED STATES PATENTS

| Number | Name | Date |
|---|---|---|
| 736,092 | Hamburger | Aug. 11, 1903 |
| 1,199,733 | Dietz | Sept. 26, 1916 |
| 2,017,503 | Knox | Oct. 15, 1935 |
| 2,285,915 | Dutton | June 9, 1942 |

FOREIGN PATENTS

| Number | Country | Date |
|---|---|---|
| 541,795 | Germany | Jan. 15, 1932 |